Reissued Feb. 16, 1943

Re. 22,269

UNITED STATES PATENT OFFICE 22,269

PRODUCTION OF WOOD IMPREGNANT FROM HIGH TEMPERATURE COAL TAR FRACTIONS

Jacquelin E. Harvey, Jr., Washington, D. C., assignor of one-half to Southern Wood Preserving Company, East Point, Ga., a corporation of Georgia No Drawing. Original No. 2,291,335, dated July 28, 1942, Serial No. 356,109, September 9, 1940. Application for reissue October 6, 1942, Serial No. 461,010

4 Claims. Cl. (196—53)

The present invention relates to the induction of useful characteristics in mixtures of tar fractions.

An object of the present invention is the induction of toxicity in a mixture of tar fractions.

Another object of the present invention is the induction of solvency in a mixture of tar fractions.

Still another object of the present invention is the joint induction of toxicity and solvency in a mixture of tar fractions.

A further object of the present invention is the production of valuable residues incidental to distillation recovery of products of the present process.

Another object of the present invention is the enhancement of toxicity in material possessing toxicity and the induction of toxic properties in material having little or no toxicity.

Another object of the present invention is the enhancement of solvency in materials possessing solvency, and the induction of solvent properties in materials having little or no solvent properties.

Other objects of the present invention will be apparent from the following disclosures.

Suitable starting materials of the present invention are mixtures of tar fractions and broadly include mixtures of tar fractions capable of having (1) toxicity, (2) solvency and toxicity, or (3) solvency induced therein.

The following examples will serve to illustrate various modes of practicing the present process.

*Example 1.*—A coal-tar pitch, substantially 15% boiling at 355° C. and having coke residue in excess of 8% is subjected to the action of hydrogen at 395° C. and 300 atmospheres pressure for a period of one hour; bomb treatment being employed. At the end of the hour period the bomb is allowed to cool and purged of its gas. Fresh hydrogen is charged to the bomb. The action of hydrogen is re-instituted on the once treated pitch, the temperature being 440° C., the pressure 300 atmospheres and the time one hour. The finally beneficiated material will have a toxicity in excess of its parent material and will be further characterized by reduction in coke residue, free carbon, viscosity, and specific gravity. The treated material will contain as fractions a wood preserving oil of induced toxic value.

The beneficiated pitch may be used in toto as a wood preservative, or if low ends non-permissible in the light of current specifications are present, the undesirable low ends may be discarded, thus producing a wood preserving oil having an initial boiling point in accordance with specifications extant: or the beneficiated pitch may be distilled to recover a specification wood preserving distillate as regards boiling ranges.

The residue incidental to recovery of the wood preserving distillate may be recycled or used as an article of commerce because of its enhanced value as compared to raw pitches.

*Example 2.*—Instead of using the pitch of Example 1 as a starting material a product intermediate (more or less) to raw tar and said pitch may be used; as for instance, a tar from which solvent oil has been stripped. For instance a residual tar whose initial boiling point is, say 240° C. may be used as starting material.

The residual tar is treated in accordance with disclosures of Example 1 to provide its product or products indicated.

*Example 3.*—Another preferred starting material for the present process is creosote, including high residue creosote, or selected fractions of any of the creosotes.

If a high residue from high residue creosote is selected as the starting material, the high residue is charged to a bomb and subjected to the action of hydrogen for 45 minutes at 500 atmospheres pressure and 400° C. Thereafter, and for an additional period of 45 minutes the material is subjected to hydrogen action at 455° C.

The thus treated material will have enhanced toxic value and may be used in toto as a wood preservative. In the event the treated material contains low boiling fractions not permissible in a specification wood preserving oil the undesirable low ends may be removed to provide conformance; or, a specification wood preserving distillate may be recovered from the treated material, with undesirable low ends, if any, discarded and the residual mass incidental distillate recovery being recycled or used as an article of commerce account its enhanced value as compared to raw pitch.

*Example 4.*—A coal tar boiling predominantly above 190° C. and having specific gravity, coke residue, and viscosity undesirable in a grade 1 wood preserving impregnant is treated with hydrogen at 400° C. and 400 atmospheres pressure for 30 minutes. Thereafter, and for a period of one hour the once treated material is again treated with hydrogen at 450° C.

The finally beneficiated material may now be employed in toto as a wood preserving oil of enhanced toxic value having lowered coke residue, specific gravity and viscosity. To provide specification conformance as regards low boiling ends, non-permissible low ends may be removed. If desired, specification distillate as regards boiling range may be recovered.

*Example 5.*—A coal tar of commerce is passed through a high pressure reaction vessel in the presence of hydrogen while contacting a catalyst at 400° C. and 500 atmospheres pressure; time of contact, 45 minutes. Thereafter, the treated material without releasing pressure is flowed to a second reactor and treated under identical conditions, except that the temperature is raised to 465° C.

The treated material upon inspection will be found to have increased toxicity, lowered coke residue, specific gravity and viscosity, and inherent qualities that make it of utility in toto as a wood preserving oil. However, undesirable low ends may be removed to provide conformance in low boiling range or initial boiling point to particular specifications for wood preserving impregnants: or specification distillate may be recovered as the preserving oil.

Instead of passing the treated tar from one reactor to another without release of pressure, the treated tar from the first reactor may be released from pressure, and thereafter be passed to one or more further reactors under pressure for additional treatment at more elevated temperatures.

All process conditions may be varied between the first and second (or other) reaction chambers.

A further exemplification of the present process resides in so controlling process conditions that toxicity induction flows from, among other things, a condensation of the range of boiling points of fractions of the starting material toward the low boiling point limit thereof, as illustrated in the following example.

*Example 6.*—A high boiling mixture of coal tar fractions, boiling 2.54% at 380° C., is passed through a high pressure reaction chamber at 500 atmospheres pressure and 400° C. in the presence of a catalyst and a supply of hydrogen of 25,000 cubic feet per barrel feed stock. The time of contact is 45 minutes. Thereafter the beneficiated tar fractions are passed through a second reaction chamber under similar conditions except the temperature is raised to 455° C.

The finally beneficiated tar fractions will be found to have toxicity induced therein, and a condensation of the range of boiling points of the mixture toward the low boiling point limits thereof, and may be usable in toto as a wood preserving impregnant. However, instead of using the overall treated material as the wood preservative of the present invention, should there be undesirable low boiling ends present, as for instance ends below specification wood preserving impregnants, the non-specification low ends may be removed, as for instance by distillation or gas stripping action, and discarded in so far as the wood preservative of the present process is concerned; or the treated material may be distilled to yield a wood preserving oil having a boiling range in accordance with accepted or specification products.

Still another exemplification of the present process resides in the joint production of superior solvents and improved wood preserving impregnants as set forth in the following example.

*Example 7.*—A coal tar of commerce having a preponderance of fractions boiling above 190° C. is subjected to the action of hydrogen at 385° C. and 500 atmospheres pressure while contacting as catalytic materials tin sulfide, and a material selected from the group consisting of halogens, halids and derivatives thereof including substitution products thereof. The time of contact is 1 hour. Thereafter the beneficiated tar is subjected to the action of hydrogen at 460° C. and 500 atmospheres pressure for an added 1 hour period.

The beneficiated tar is distilled to an upper limit of 235° C. to recover the solvent of the present invention as a distillate having an aromatic nature of not substantially less than 50%, and the remainder as a wood preservative of enhanced toxic value. However, the solvent and wood preservative, both, may be recovered as distillates.

The point of fractionation between the solvent and wood preservative is not inflexible inasmuch as commercial solvents currently on the market have varied end points and wood preservatives of current use have varied initial boiling points. Thus, inasmuch as the end point of the solvent of the present invention substantially corresponds to the initial boiling point of the wood preservative of the present invention, it will be immediately obvious that the point of fractionation is not inflexible, but may be varied at will.

In the tabular data shown below are solvents and wood preservative of accepted specifications, their end points and initial boiling point, respectively, any one of which may be produced by the process of the present invention:

SOLVENTS

| Identification: | End point |
|---|---|
| Benzol | 120° C. |
| Toluol | 150° C. |
| High flash naphtha | 200° C. |
| Heavy naphtha | Above 200° C. |

WOOD PRESERVATIVES

| Identification: | Initial point |
|---|---|
| A. W. P. A. | 5% at 210° C. |
| A. W. P. A. | 1% at 210° C. |
| A. W. P. A. | 1½% at 210° C. |

WOOD PRESERVATIVES

| Identification: | Initial point |
|---|---|
| A. W. P. A. | 10% at 210° C. |
| Prussian Ry | 3% at 150° C. |
| N. S. S. O. | 150° C. |
| S. P. S. S. O. | 92° C. |
| Carbolineum | 270° C. |

*Example 8.*—Yet another exemplification of the present invention is the treatment of tars of aromatic content, or fractions thereof, derived from petroleum whereby to produce solvents.

A tar of aromatic content of petroleum derivation having the following inspection:

| | |
|---|---|
| Gravity | 10.8 |
| Flash, P. M. C. C., deg. F | 295 |
| Flash, C. O. C., deg. F | 290 |
| Fixed carbon, % | 4.9 |
| Pour point, deg. F | −10 |
| B. S. & W. % by vol | 0.1 |
| S. U. Vis. @ 100 deg. F | 151 |
| S. U. Vis. @ 210 deg. F | 41 |
| S. F. Vis. @ 77 deg. F | 34.5 |
| Carbon residue | 6.8 |
| Per cent aromatic & unsaturates (BPM) | 84.4 |
| Sol. in carbon bisulfide | 99.8 |
| Loss, 50 grams, 5 hours, @ 325 deg. F | 8.9 |
| Residue of 100 pene., % | 37.5 |

| | |
|---|---|
| A. S. T. M. distillation | |
| I. B. P., deg. F | 518° |
| 10% | 565° |
| 20% | 589° |
| 30% | 614° |
| 40% | 637° |
| 50% | 660° |
| 60% | 675° |

is subjected to the action of hydrogen at 415° C. and 400 atmospheres pressure for a period sufficient to reduce coke residue, specific gravity and viscosity. Thereafter, the temperature is raised to 465° C. and reaction conditions continued for an hour. The beneficiated material is distilled to an upper limit of 360° C. to recover as a distillate an aromatic natured solvent of the present invention which may be fractionated, if desired. The residue, with or without addition of fresh starting material to restore original volume, is recycled to the end that the starting material may be converted in a percentage approaching unity into the aromatic natured solvent of the present invention.

The time element of the present invention is difficult to express in arbitrary limits. The time employed in the step characterized by the lowest temperature of treatment is that period necessary to reduce specific gravity, coke residue, and viscosity, and to place the overall treated material in condition so that when the induction rate of toxicity, solvency, and toxicity, and/or solvency is enhanced by a more elevated temperature step, inordinate coking does not occur. Periods of one hour in either temperature step are usable, however, longer or shorter periods may be employed.

As is well known, the action of hydrogen proceeds at moderate temperatures. Temperatures in the order of from 300°–450° C. are satisfactory for the process; but higher or lower temperatures may be employed. Pressures in the order of at least 200 atmosphers are preferred, however, lower pressures will provide an illustration of the present process. Pressures as high as practicable may be employed.

When practicing the present process in a continuous manner, gas flow of in excess of 2,000 cubic feet are usable, and as high as 25,000–30,000 or higher, may be employed.

By the term beneficiated as used herein and in the appended claims is meant the starting material at least once subjected to the action of hydrogen.

In accordance with the present process, the action of hydrogen is so controlled as to induce no coking action that would preclude commercial operation.

Hydrogen action is further so controlled as to effect or assist in reduction, including in size if desired, of high molecular complexes that may be contained in the starting material.

Tar, or tar fractions, at least once refined by hydrogen action are preferred starting materials.

Catalysts effective in the presence of hydrogen may be employed, and are especially desirable; for instance sulphides and/or oxides of metals, separately or in admixture and in any effective manufacture. Catalyst aids or promotors may be used, as for instance, halogens or halids including derivatives, substitution or addition products thereof. The oxides and/or sulfides of molbdenum, uranium, vanadium, tin, tungsten, with or without aids, are especially effective, and may be used in various forms.

The action of hydrogen on the starting materials is further characterized by the induction of toxicity, solvency and toxicity, and/or solvency while simultaneously condensing the range of boiling points of fractions of the starting material toward the low boiling point limits thereof.

In the present process, product recovery may be effective by gas stripping action, and in all examples cited any nature of stripping action may be substituted for distillation steps. The gas stripping action may be effected while the treated material is under pressure.

The process of the present invention may be practiced in a bomb, an intermittent autoclave, or a continuous reaction vessel. In the event of continuous practice, same may be effected in a single reaction vessel, a series thereof, a parallelism thereof, including a multiplicity thereof.

In the provision of the wood preservatives of the present invention, processing controls may be so held as to provide a beneficiated material capable of providing in toto, or of being distilled to provide, the boiling range of any of the following current specifications covering wood preserving oils.

WOOD PRESERVING IMPREGNANTS

*Specifications*

1. A. W. P. A.
   - *a.* Up to 210° C., not more than 5%
   - *b.* Up to 235° C., not more than 25%
2. A. W. P. A.
   - *a.* Up to 210° C., not more than 1%
   - *b.* Up to 235° C., not more than 10%
   - *c.* Up to 355° C., not less than 65%
3. A. W. P. A.
   - *a.* Up to 235° C., not more than 1½%
   - *b.* Up to 300° C., not more than 16½%
   - *c.* Up to 355° C., not less than 45%
4. A. W. P. A.
   - *a.* Up to 210° C., not more than 8%
   - *b.* Up to 235° C., not more than 35%
5. A. W. P. A.
   - *a.* Up to 210° C., not more than 10%
   - *b.* Up to 235° C., not more than 40%
6. A. W. P. A.
   - *a.* Up to 210° C., not more than 5%
   - *b.* Up to 235° C., not more than 15%
7. Prussian Ry.
   - *a.* Up to 150° C., not more than 3%
   - *b.* Up to 200° C., not more than 10%
   - *c.* Up to 235° C., not more than 25%
8. N. P. V. & L. A. #220
   - *a.* 5% at 162° C.
   - *b.* 97% at 270° C.
9. S. P. S. S. O.
   - *a.* 5% at 137° C.
   - *b.* 95% at 257° C.
10. N. S. S. O.
    - *a.* I. B. P., 150° C.
    - *b.* 5% at 205° C.
    - *c.* 95% at 292° C.
11. Carbolineum, 270° C., I. B. P.

The foregoing abbreviations are explained as follows:

A. W. P. A. means American Wood Preserver's Association; N. P. V. & L. A. means National Paint Varnish and Lacquer Association; S. P. S. S. O. means Southern Pine Shingle Stain Oil; N. S. S. O. means Neville Shingle Stain Oil.

A convenient test for solvency is by the evaluation of the well-known Kauri-butanol. Toxicity may be evaluated in accordance with "Method of conducting the tests," page 2, Technical Bulletin No. 346, U. S. Dept. of Agriculture, March, 1933.

By the term "superior solvents" is also meant that the solvents so described have a solvency in excess of solvents extant.

Minor changes may be made in the steps of the process, within the scope of the following claims, without departing from the spirit of the invention.

I claim:

1. In the production of a wood preserving impregnant the process which comprises: subjecting a mixture of high temperature coal tar fractions selected from the group consisting of coal tar, topped coal tar, high boiling coal tar fractions boiling preponderantly above 380° C. and coal tar pitch to the action of hydrogen at a temperature selected between the range of 300–450° C., a pressure in excess of atmospheric and for such length of time as to reduce coke residue and viscosity; thereafter subjecting the beneficiated mixture of coal tar fractions to further hydrogen action at a more elevated temperature not below 440° C. or in excess of substantially 465° C. and for such a length of time as to produce newly formed oils of the wood preserving type characterized by induced toxic value.

2. In the production of a wood preserving impregnant the process which comprises: subjecting a mixture of high temperature coal tar fractions selected from the group consisting of coal tar, topped coal tar, high boiling coal tar fractions boiling preponderantly above 380° C. and coal tar pitch to the action of hydrogen at a temperature selected between the range of 300–450° C., a pressure in excess of atmospheric and for such length of time as to reduce coke residue and viscosity; thereafter subjecting the beneficiated mixture of coal tar fractions to further hydrogen action at a more elevated temperature not below 440° C. or in excess of substantially 465° C. and for such a length of time as to produce newly formed oils of the wood preserving type characterized by induced toxic value; and fractionating the beneficiated material to segregate the wood preserving oil.

3. The process of claim 2 in which the wood preserving impregnant is a residual.

4. The process of claim 2 in which the wood preserving impregnant is a distillate.

JACQUELIN E. HARVEY, JR.